United States Patent [19]

Aisenberg et al.

[11] 3,943,465
[45] Mar. 9, 1976

[54] DUAL FIELD EXCITATION FOR A CARBON DIOXIDE LASER

[75] Inventors: Sol Aisenberg, Natick; Kuo Wei Chang, Lexington, both of Mass.

[73] Assignee: United States of America as represented by the Secretary of the Navy

[22] Filed: Mar. 21, 1974

[21] Appl. No.: 453,241

[52] U.S. Cl. .................................. 331/94.5 PE
[51] Int. Cl.² .................................. A0153/22
[58] Field of Search .............. 330/4.3, 331/94.5 G, 315/147, 148, 260

[56] References Cited
UNITED STATES PATENTS

| | | | |
|---|---|---|---|
| 2,116,702 | 5/1938 | Kern et al. | 315/147 |
| 2,565,110 | 8/1951 | Adams | 315/147X |

Primary Examiner—Robert J. Webster
Attorney, Agent, or Firm—R. Sciascia, R. Beers, S. Scheinbein

[57] ABSTRACT

The present invention relates to improved method and structure for producing an electric discharge in a laser cavity which eliminates arcing and permits electron energy to be chosen based on energy requirements for accelerating the electrons rather than energy and/or pressure requirements for supplying electrons. An auxiliary discharge is maintained to provide the electrons necessary for laser excitation. A transverse electric field is then superimposed to impart the energy required to accelerate the electrons.

6 Claims, 4 Drawing Figures

DUAL FIELD EXCITATION FOR A CARBON DIOXIDE LASER

BACKGROUND OF THE INVENTION

With the advent of high power gas lasers, the amount of power lost through inefficient operation is continuously increasing. This problem is important not only because of economic considerations, but also because the amount of energy being dissipated as heat has serious deleterious effects on the laser materials, resulting in degradation of its components. Maximum laser efficiency, can, in principle, be best achieved by tailoring the energy requirements to obtain excitation of the metastable state or the upper laser level. But unfortunately, this theory is generally inapplicable for existing gas lasers which employ conventional methods of gaseous discharge since in these cases, the average electron energy is largely dictated by the conditions and requirements for maintaining a sustained discharge.

For $CO_2$ lasers involving vibration-rotation transitions, operation at high pressures is generally more desirable. By raising the gas pressure, the laser power output can conveniently be increased without increasing the cavity dimensions, thereby eliminating the need for using long cavities which are difficult to manage. Unfortunately, at high gas pressures, uniformly distributed electrical discharges are very difficult to maintain and laser oscillation may terminate because of arcing and localized current build up.

An example of arcing being caused by high gas pressures occurs in a pulsed $CO_2$ laser where the high density of the active molecules requires that the energy per pulse per unit volume increase linearly with the gas pressure. The increase in gas pressure becomes apparent, if it is recognized that population of the upper energy levels is generally induced by three methods. In the first method electrons collide directly with $CO_2$ molecules. A second method involves an intermediate reaction and requires traces of a secondary gas, such as $N_2$ within the discharge chamber. The electrons first collide with the $N_2$ molecules and the excited $N_2$ molecules, in turn, collide with ground state $CO_2$ molecules. Each collision may add photons to the laser field, and thus the second method is often used in conjunction with the first to increase the power output of the laser. Without the presence of the secondary gas this intermediate reaction does not occur since after contributing photons to the laser field, the excited $CO_2$ molecules are left in the lower state of laser transition. However, the molecules eventually decay to the ground state at which point they can be re-excited by collision with the $N_2$ molecules. A third method may also increase the power output of the laser and involves deactivation of the lower laser levels by the addition of a gas which depopulates the lower energy levels. The repetition rate of all the molecular collisions is directly related to the gas pressure and consequently, the maximum laser power available per unit volume depends on the operating pressure. Therefore, if high output power in a pulsed $CO_2$ laser is desired, it is accompanied by an increase in pressure. This increased pressure can cause arcing since although the voltage drop across a cathode is essentially constant, a negative electrode within a plasma does not provide a uniform discharge distribution. Intense plasma distributed locally creates a bright or hot cathode spot having an energy input per unit area which increases rapidly with pressure to cause arcing. Also, the thickness of the cathode drop region decreases as the pressure increases causing the energy dissipated per unit volume in the cathode drop region to increase, resulting in current build up which, in turn, causes arcing. For all these reasons, the tendency of a glow discharge to change into an arc increases rapidly as the gas pressure is raised.

One solution to this problem has recently been proposed in an article titled "Transversely Excited Atmospheric Pressure Carbon Dioxide Laser" by A. J. Beaulieu. This article relates to a pulsed atmospheric pressure $He-N_2-CO_2$ laser wherein a transversely excited discharge of short duration is maintained between the large flat anode and a row of resistive pin cathodes. A large number of these resistors are used to impede localized current build up which prevent local arcing of plasma and achieve a laser output of 2J per pulse at a repetition rate of 1,000 PPS and an efficiency of 17%. The current pulse for exciting the laser is obtained by discharging a 0.02 microfarad capacitor which had been charged to 17,000 volts. However, the discharge stability obtained was accompanied by a reduction of efficiency due to energy losses in the resistor network and therefore the Beaulieu device also has a considerable energy loss during its operation.

SUMMARY OF THE INVENTION

An object of the invention is to reduce the energy requirements of a high pressure gas laser.

Briefly, the present invention overcomes the difficulties common to high pressure gas lasers by permitting electron energy to be chosen largely based on the energy considerations required to accelerate electrons instead of energy/pressure requirements necessary to supply the electrons. One embodiment of the invention comprises of a row of auxiliary electrode means, each electrode means consisting of a cathode and anode which independently maintains an auxiliary discharge. A principal discharge is maintained between a large flat or cylindrical anode and a virtual cathode which is created within the body of a glow plasma produced by the auxiliary electrodes. A principal discharge is maintained transverse to the auxiliary discharge and independently thereof to accelerate the electrons and effect the number of collisions between the electrons and the gas molecules. With the auxiliary discharge produced by the plasma cathode supplying the required electrons, and the accelerating electric field being independently controlled by the principal discharge, the present device permits a wider range of operating parameters of a $CO_2$ laser than is available through prior art devices.

In a specific embodiment, the auxiliary electrodes can consist of brush cathodes, gas-fed hollow cathodes, or simply wire mesh. To prevent current concentration and arcing, distribution resistors or simple solid state constant current devices can be placed in series with the auxiliary electrodes. Since the power required to maintain the auxiliary discharge constitutes only a small portion of the total power input, energy dissipated by the distribution resistors is considerably less than the energy dissipated by resistors placed in the primary discharge circuit.

BRIEF DESCRIPTION OF THE DRAWING

Other objects, advantages and novel features of the present invention will appear from a reading of the following detailed description of the invention when considered in conjunction with the accompanying drawings, in which.

DETAILED DESCRIPTION OF THE INVENTION

Figure 1:
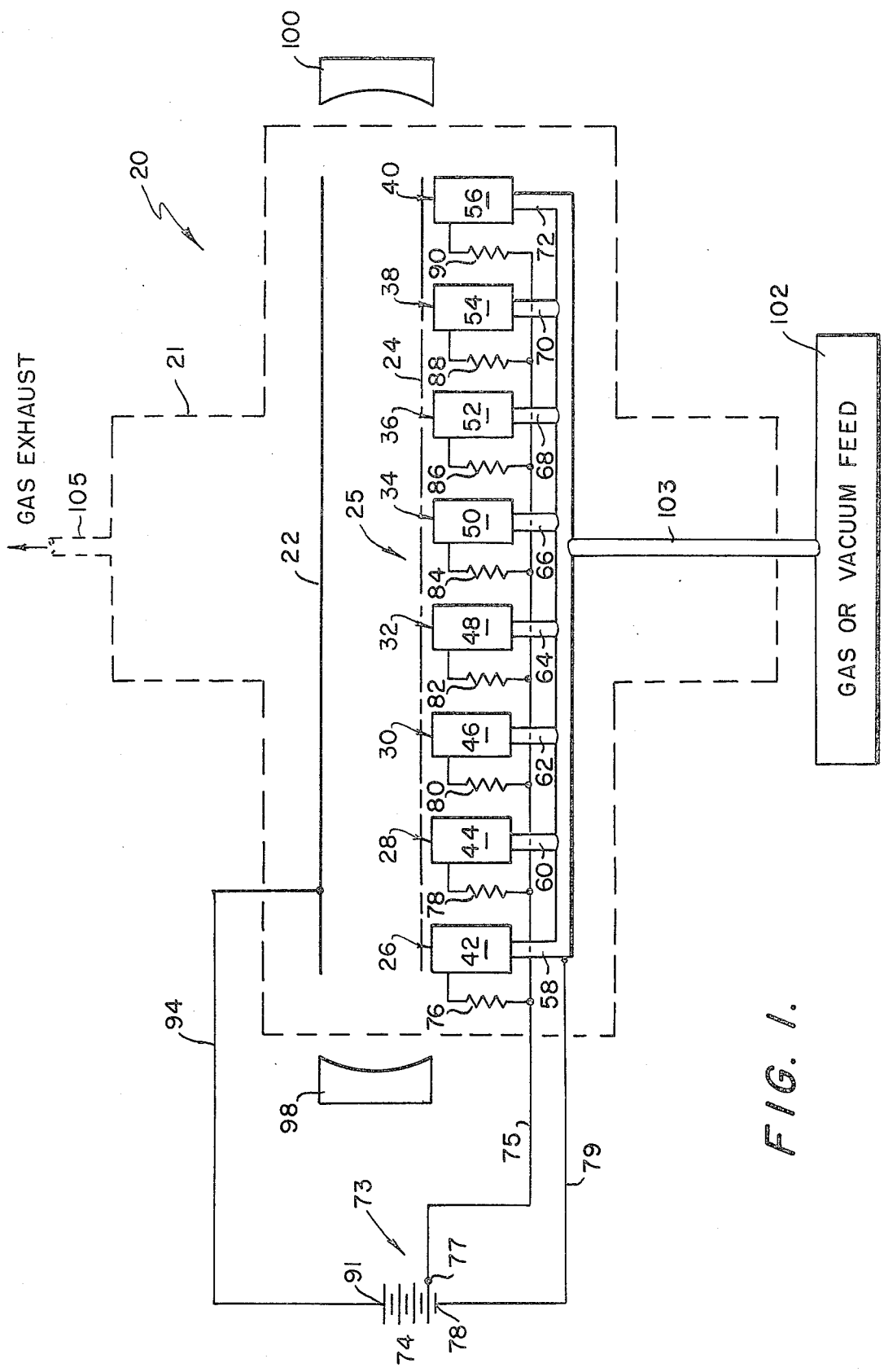
FIG. 1 is a schematic illustration of an embodiment of the invention when energized from a DC source.

Referring to the drawings, and initially to FIG. 1, there is shown a general view 20 of an embodiment of the invention which can be used with a gaseous discharge device. It should be understood that the drawing is for purposes of illustration only and is not drawn to scale. An envelope 21 is shown by dotted lines which describe generally the outline of a laser cavity. Within the envelope 21, a principal discharge is maintained between a large flat or cylindrical anode 22 and virtual cathode 24 located within an auxiliary discharge region 25. The auxiliary discharge region 25 is produced by the combined effect of the individual discharges of electrodes 26-40, which are disclosed in detail in the discussion of FIGS. 2 and 3. Generally, however, these electrodes consist of stainless steel rectangular anodes, 42-56, and corresponding stainless steel tubes 58-72. A potential difference is maintained between anodes 42-56 and cathodes 58-72 and is derived from an auxiliary tap 73 on power source 74, auxiliary tap 73 having its positive terminal 77 connected to the rectangular anodes 42-56 by lead 75 corresponding distribution resistors 76-90. It's negative terminal 78 is connected to tubes 58-72 via conductor 79. The power dissipated by distribution resistors 76-90 is a fraction of the power being supplied by primary source 74 due to the fact that the power requirements for the auxiliary electrodes 26-40 are only a fraction of that required for the main discharge.

Anode 22 is connected to positive terminal 91 of power supply 74 by conductor 94, thus maintaining a potential difference between anode 22 and the virtual cathode 24. Mirrors 98 and 100 are of the conventional type used to promote oscillation and the laser output may be taken at the location of either mirror by appropriate selection of transmissive mirrors or windows, such as a mirror with a small aperture.

In the case of $CO_2$ lasers, gas may be introduced into the glow discharge region 25 through the stainless steel tubes 58-72. A supply 102 is used to introduce $CO_2$ to the tubes 58-72 through duct 103 and thus to the auxiliary discharge region 25. If the $CO_2$ is drawn through the auxiliary electrodes into the discharge region 25, the gas pressure at the point where it is discharged through the cathodes is greater than in the discharge region 25; and the additional differential pressure aids in maximizing the cathode operation at high operating pressures. In this event, the gas can be withdrawn from the chamber by any means, such as a vent port 105 located behind the anode or elsewhere. An alternative way is to connect a vacuum pump 102 to the tubes 58-72 to pull the gas in the chamber through the capillaries resulting in the interior of the tubes being operated at a lower pressure relative to the discharge region 25. For the alternative method gas must be introduced into the chamber through port 105 and the tubes 58-72 are then used as the exhaust ports.

Figure 3:
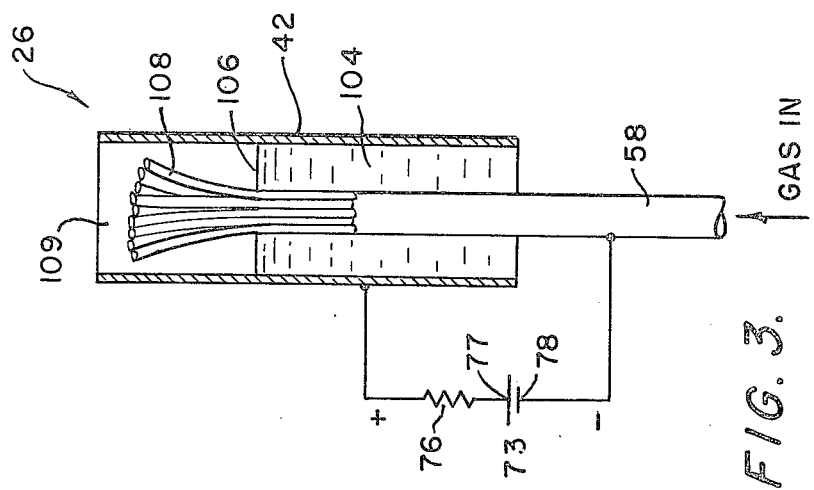
FIG. 3 is a cross-sectional view of the brush hollow cathode of FIG. 2.
Figure 2:
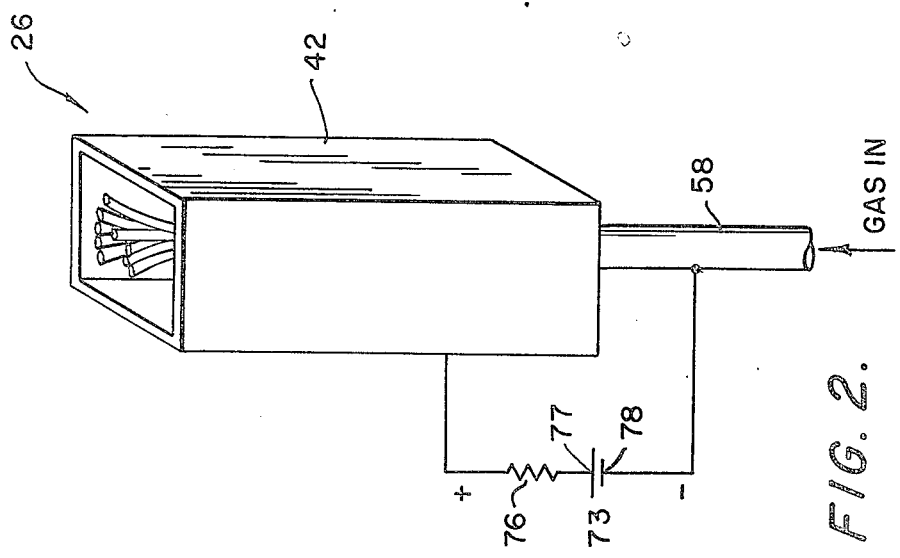
FIG. 2 is a perspective view of a brush hollow cathode used in the embodiment of FIG. 1.

The operation of the auxiliary discharge electrodes 26-40 will be more apparent upon a review of FIGS. 2 and 3 where a detailed drawing of electrode 26 is shown. Electrode structure 26 is shown with the stainless steel rectangular anode 42 being insulated from stainless steel tube 58 by means of a ceramic epoxy insulator 104. Once again, the potential difference is maintained between anode 42 and tube 58 by means of auxiliary tap 73 and distribution resistor 76. Extending from the end 106 of the epoxy insulator 104 is a plurality of stainless steel capillary tubes 108 which are electrically connected to tubular conductor 58 and thus also maintained at a potential difference relative to the rectangular anode 42. The capillary tubes 108 form a brush cathode which together with anode 42 create an auxiliary discharge region therebetween. $CO_2$ gas supplied through stainless steel tube 58 enters discharge region 25 through the capillaries 108. The electric field established between anode 42 and the capillaries 108 sometimes causes the plasma to enter the capillaries 108 depending on the pressure within the capillaries.

Although capillaries 108 are shown, wire mesh could be used. In this event, the wire mesh would cover the opening in the end 106 of the epoxy insulator 104 while also being electrically connected to the tube 58. The only requirement for the wire mesh is that it contain apertures to allow the flow of gas between tube 58 and region 25.

The plasma consists of a mixture of gas, ions and electrons. The ions return to the cathode. The electrons within the plasma travel to anode 22 and anodes 42, 44, 46, 48, 50, 52, 54, 56 and their acceleration depends on the magnitude of the electric field established by source 92. Thus the plasma generated by each electrode acts as a cathode and when all of the electrodes 26-40 are aligned as shown in FIG. 1, the virtual plasma cathode, approximately along line 24, develops. The movement of the electrons from the plasma cathode 24 to the anode 22 results in collisions between the accelerated electrons and the gas molecules and ions and these collisions initiate the lasing activity.

As mentioned, in one mode of operation, traces of a secondary gas, such as nitrogen, must be present in the discharge chamber in order to populate the upper laser level. Nitrogen can be supplied to the discharge chamber by mixing it with the $CO_2$ gas. The electric field existing between anode 22 and virtual cathode 24 can be maintained by source 74 to select the electron acceleration independently of the power requirements for the auxiliary discharge electrodes 26-40. Collisions between the accelerated electrons and $N_2$ molecules causes population inversion of the upper laser level of the $CO_2$ molecules and the frequency of these collisions is also related to the electric field.

An atmospheric pressure laser is capable of continuous wave or pulsed operation. However when the laser is used in the pulsed operation mode, inductances should be placed in series with the individual electrodes 26-40 to aid in uniform distribution of the current. The inductances are relatively loss free and eventually return the energy to the laser. However, often this energy is returned after the laser activity is terminated, and thus the use of inductances does not always, increase the operational efficiency of the system. As an alternative to the inductances, a section of transmission line can be used. The transmission line has energy reflecting capabilities which introduces a delay and results in a flat top pulse.

Figure 4:
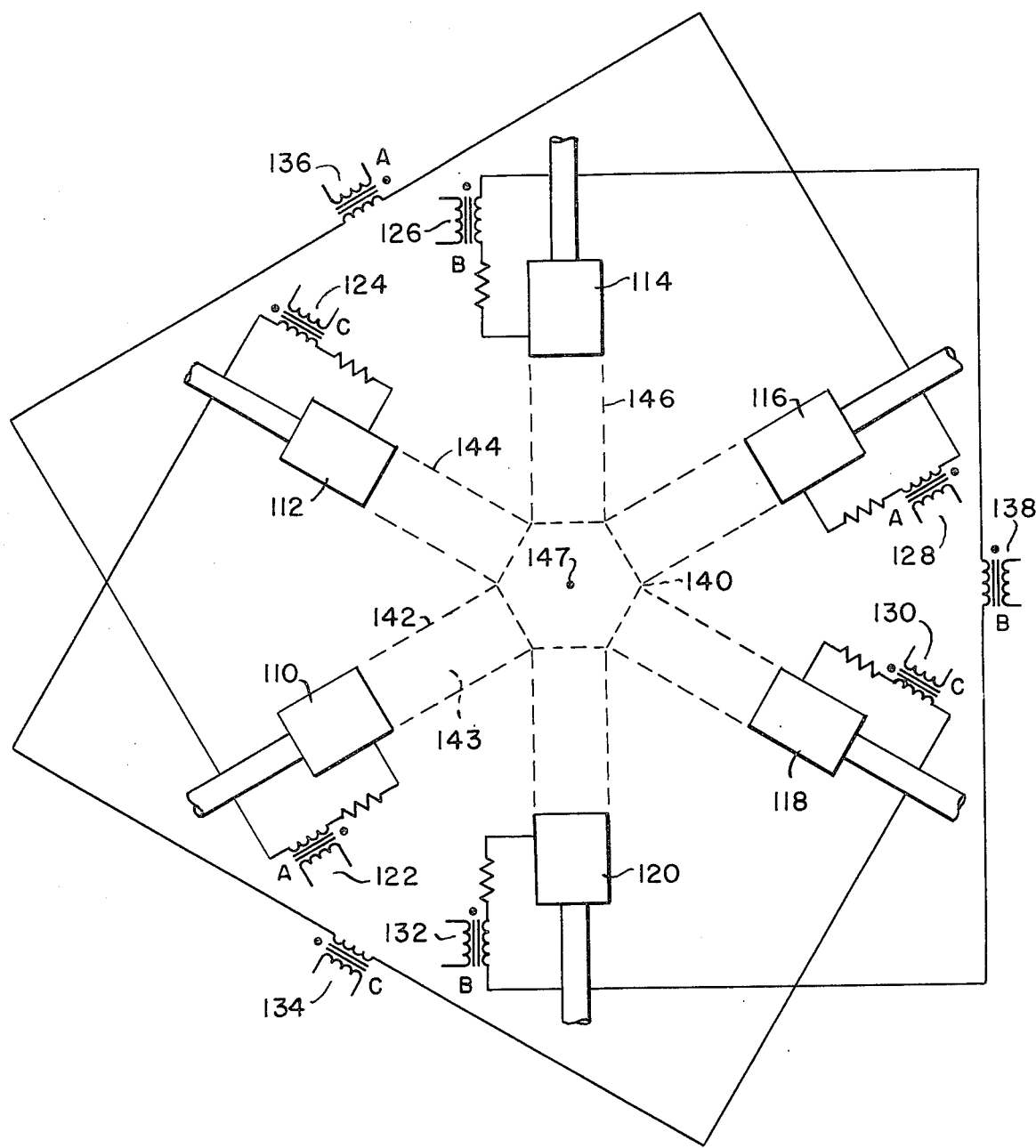
FIG. 4 is a schematic illustration of another form of the invention when energized from an AC source.

The structure shown in FIG. 1 is designed to operate with a DC power supply or pulsed supply and is practical only for reasonable power levels. When laser activity in the multi-megawatt range is desired, a DC or pulsed power supply becomes restrictive. The structure shown in FIG. 4 is designed to operate from raw AC through a 3-phase 60 cycle per second transformer and the power supply problems associated with an AC system of this type are significantly less than its DC or pulsed counterpart. Anode 22 and virtual cathode 24 of FIG. 1 have been replaced in FIG. 4 by a symmetrical electrode structure which functions either as a cathode or anode, depending on the portion of the AC cycle in operation at a given instant. The structure of the auxiliary discharge electrode 110-120 is identical to that shown in FIGS. 2 and 3, with the power for the electrodes 110-120 being derived in FIG. 4 from auxiliary taps 122-132 on high power transformers 134-138. The phases of the transformer windings 134-138 and the auxiliary windings 122-132 are shown by the conventional dot method.

As mentioned, the electrodes 110-120 operate both as a cathode and anode and to aid in understanding this operation, electrode pair 114 and 120 is discussed in detail. The potential difference between cathode and anode of electrode 114 is maintained by auxiliary transformer tap 126. Similarly, auxiliary transformer tap 132 is used to generate the potential difference for electrode 120 thus enabling it to produce the required supply of electrons. High power transformer 138 alternately drives one of the electrodes 114 or 120 more positive than the other. During the period when electrode 114 is positive with respect to electrode 120, electrode 114 acts as the anode and electrode 120 as a cathode, with electrons traveling from electrode 120 to electrode 114 during this portion of the operating cycle. During the portion of the cycle which electrode 120 becomes positive relative to electrode 114, electrode 120 acts as the anode and electrode 114 as the cathode with electrons traveling from electrode 114 to electrode 120. The remaining electrode pairs operate in similar manner with each electrode operating as a cathode for a portion of the AC cycle and as an anode for other portions AC cycle. The electrons emitted by the cathode generally travels directly to the anode of the same electrode pair. Occasionally, however electrons are diverted to one or more of the other positive electrodes. But the effect of this diversion of electrons is minimal since the electrons must have a return path to the cathode source of electrons. Thus a secondary anode accepts only a few extra electrons before it becomes saturated and refuses to accept additional electrons.

To maintain a high plasma utilization within the active region, the spacing between the electrodes in each pair is maintained at a distance comparable to the diameter of the beam so that the plasma region outside of the central intersection 140 is kept at a minimum. The plasma region which is not common to all electrode pairs, such as region 142, represents a loss of power and efficiency, and should be corrected either by proper spacing of the electrodes or by designing mirrors large enough to encompass the outer plasma space. If not corrected, the region such as 142 of plasma exterior to the common region 140 continues to lase but since these regions are effected by only one electrode pair operating for one-third of the total duty cycle, the lasing operation in these areas is discontinuous and contains a high ripple component. The mirrors are not shown in FIG. 4 for purposes of clarity. The mirrors would be placed along an axis 147, which is directed into the page. Once again the laser output may be taken at the mirror locations.

Thus, there is described improved method and apparatus which permits electron energy in a laser cavity to be chosen based on energy requirements for accelerating electrons rather than energy requirements for providing a sufficient number of electrons. By maintaining an auxiliary discharge to provide the the necessary electrons to the laser and providing a transverse electric field to accelerate the electrons, the excitation of the laser can be controlled independently of the requirements for maintaining the sustained discharge.

Obviously, many modifications and variations of the present invention are possible in light of the above teachings. It is therefore to be understood that, within the scope of the appended claims, the invention may be practiced otherwise than as specifically described.

What is claimed is:

1. An electron discharge device comprising:
   a. a first pair of spaced electrode structures facing each other, each electrode structure comprising an anode, a cathode, and a gas source for supplying a gas suitable for ionization to said electrode structure, said cathode and anode being adapted to hold a first electrical potential difference therebetween thereby producing an auxiliary discharge region, said gas reacting with said auxiliary discharge region to form a plasma, each of said electrode structures being adapted to emit electrons toward the other over the spacing therebetween when a second relative electrical potential difference exists between said pair of electrodes, said second relative potential difference being variable independently of said first electrical potential between said cathode and said anode thus making the electron emissions through the spacing between said electrodes independent of said first electrical potential;
   b. at least one additional pair of similarly constructed spaced electrode structures facing each other but arranged so that the electrons traversing the space therebetween cross a section of the space between the first pair of electrode structures; and
   c. means adapted to receive and utilize a multiphase alternating current to energize the cathode and anode of each electrode pair, the total number of phases being proportional to the total number of electrode pairs, whereby each pair of electrode structures is energized at different time intervals during a cycle of operation.

2. An electron discharge device as defined in claim 1, wherein said cathode in said electrode structure comprises a plurality of capillary tubes bunched together and open at both ends to permit the flow of gas through the length thereof, said tubes being connected at one end to said gas source; and wherein said anode is spaced from, surrounds, and extends over the lengths of said tubes.

3. The device of claim 2 wherein said tubes and said anode are made of stainless steel.

4. An electron device as defined in claim 1, further comprising: a pair of mirror means facing each other and positioned so that light traversing the space therebetween crosses the intersection point of the paths between said electrode pairs.

5. A method of operating an electron discharge device having different pairs of spaced electrode structures each having a cathode and an anode comprising the steps of:
   a. alternately projecting electrons over a first path between a first pair of said spaced electrode structures by
      establishing a first potential difference at one electrode structure of said pair between its anode and cathode so that an auxiliary discharge region is formed;
      introducing a gas into said auxiliary discharge region so that said gas reacts with this region to form a plasma;
      maintaining a second potential difference between said pair of electrodes which may be varied independently of the first potential difference between said cathode and anode so that a portion of the electrons in said plasma are emitted over said first path between said electrode structures;
      then removing said first and second potential differences from said one electrode structure and then following essentially the same steps with the other electrode structure of said pair;
   b. alternately projecting electrons over at least one additional path from a different pair of electrode structures in the same manner as said first pair of electrode structures, said additional paths intersecting said first path in a specific region.

6. A method of operating an electron discharge device having different pairs of spaced electrode structures, which includes:
   introducing a gas suitable for lasing into the region between the pairs of electrode structure;
   alternately projecting electrons over a first path between one pair of said spaced electrode structures so that said electrons collide with the gas molecules;
   alternately projecting electrons over at least one additional path from a different pair of electrode structures so that said electrons collide with the gas molecules, said additional paths intersecting said first path in a specific area, said collisions of said alternately projecting electrons with said lasing gas creating a population inversion in said lasing gas; and
   reflecting the light emitted by said gas during lasing back and forth through the intersection region of said first and said additional paths so that the emission of a coherent beam of radiation from said inverted gas population is stimulated.

* * * * *